United States Patent Office 3,514,260
Patented May 26, 1970

---

3,514,260
HYDROGEN PRODUCTION
Robert A. Baillie, Chester, Pa., assignor to Sun Oil Company, Philadelphia, Pa., a corporation of New Jersey
No Drawing. Filed Oct. 20, 1967, Ser. No. 676,721
Int. Cl. C01b 1/03
U.S. Cl. 23—213
8 Claims

ABSTRACT OF THE DISCLOSURE

A high pressure process for the production of hydrogen which comprises in combination a steam-hydrocarbon reforming step at a temperature of about 1900°–2100° F. and a pressure of about 1500–3000 p.s.i.g. over a reforming catalyst to form hydrogen and carbon monoxide, charging said carbon monoxide to a shift reaction carried out at a temperature of about 350° F.–900° F. and a pressure of about 1500–3000 p.s.i.g. over a shift reaction catalyst. At the foregoing pressures the carbon dioxide by-product of the shift reaction can be removed by a hot water absorption technique at a temperature of about 60°–400° F.

---

In brief, this invention is directed to the production of hydrogen and more particularly is directed to improvements in the production of hydrogen involving steam-methane reforming, followed by the water-gas shift reaction, whereby the economics are materially enhanced.

Hydrogen is being consumed at an ever increasing rate due both to the expansion of existing processing techniques and in large part due to recent technological advances which have provided entirely new processing techniques employing same. The processes involving the use of hydrogen are always in a highly competitive field. Therefore, it is apparent that processes which can achieve significant economies in the production of hydrogen are to be highly commended.

In the prior process of steam-methane reforming and shift reactions, the first step has generally employed methane and steam which are reacted to produce carbon monoxide and hydrogen. In the second step, the carbon monoxide is in turn reacted with additional steam to produce additional hydrogen in a shift reaction or converter. In such processes, the reforming step is generally carried out at a temperature in the range of about 1500° to 1700° F. and the reaction pressure is generally about 150 to 300 p.s.i.g. The shift reaction is normally carried out at a temperature in the range of about 300° to 900° F. and a pressure of from about atmospheric to about 400 p.s.i.g. The exact temperature and, to a lesser extent, pressure depend in large parts on the specific catalyst employed. The methane feed is typically received at a pressure of about 450 to 600 p.s.i.g. from the supplier. It can thus be seen that a pressure reduction must be brought about before carrying out the foregoing process steps. Subsequent to carrying out the steam-methane reforming and shift reactions, the hydrogen so produced must be increased in pressure for the manufacturing process in which it is to be employed because the major uses for hydrogen are in ammonia manufacturing and in hydrotreating (particularly, hydrocracking) refining of petroleum, and these processes employ pressures of about 3000 to 5000 p.s.i.g. and about 1500 to 3000 p.s.i.g. respectively. The original pressure of the methane as received from suppliers is lost by the product hydrogen and the hydrogen must be recompressed to even a higher pressure. Still further and more important in converting methane to hydrogen, the number of molecules, and still further advantages will necessarily entails compressing a much greater volume of gas, as hydrogen than would be involved in compressing an equivalent amount of methane.

It has occurred to me that significant economies of operation in the steam-methane reforming and shift reaction can be achieved if carried out at a pressure of about 1500 to 3000 p.s.i.g. whereby inefficiencies of decompression followed by recompression are avoided; necessary compression is carried out on a considerably lesser number of molecules, and still further advantages will obtain by reason of such conditions as the ability to use water absorption for $CO_2$ removal instead of more expensive systems such as acid gas absorption systems employing alkanol amines.

Accordingly, this process in brief comprises carrying out in combination a steam-hydrocarbon reforming step at a temperature in the range of about 1900° to 2100° F. and a pressure of about 1500 to 3000 p.s.i.g. to form hydrogen. In another embodiment it comprises in addition charging carbon monoxide by-product of the steam-methane reforming and excess steam to a shift reaction step carried out at a temperature of about 350° to 900° F. The pressure in the second step is approximately the same as the pressure in the first step. The carbon dioxide by-product from the shift reaction can be removed by a hot water absorption technique when the reaction is carried out at a pressure of about 1500 to 3000 p.s.i.g. The temperature of the hot water absorption technique is about 60° to 400° F.

The catalyst materials conventionally employed in the steam-methane reforming such as nickel on alumina-silica may be employed in the present process. Of course, modifications in such a catalyst to improve its efficiency under the new conditions of this invention may be desirable; however, those catalysts presently available can be employed with success. Other such reforming catalysts that can be employed and which are presently commercially available are listed as illustrative examples of same. They are:

Girdler G–56 is a nickel-based catalyst supplied by Chemetron Corporation for use at reforming temperatures in the range of 1100° to 2000° F. Girdler G–31 is supplied by that same company for use at temperatures of 1850° to 2200° F. Catalyst and Chemicals, Inc. supplies a nickel-based catalyst C–14 for use at temperatures above 1800° F. and a chrome-based catalyst C–15 for use above 2200° F. Other competitive catalysts are available from other sources.

The particular temperature within the range of 1900° to 2100° F. being selected to provide an acceptable reaction rate at the pressure employed. The pressure within the range of 1500 to 3000 p.s.i.g. in both the reforming step and the shift reaction step being selected to provide for a minimal differential between same and the pressure in the process in which the product hydrogen is used as a reactant.

While methane is the most preferred feed it can be substituted in whole or in part by one or more of the following: ethane, propane, butane and low value straight run naphthas. Sulfur is a catalyst poison and accordingly is to be kept at a very low value in the feed, on the order of about 2 p.p.m. or less.

As in the case of prior art processes, a high steam to hydrocarbon ratio is to be employed in both steps. Preferably a minimum of about 2 molecules of water (as steam) per atom of carbon is employed so as to avoid the deposition of carbon on the reformer catalyst and to avoid reducing the shift catalyst. The amount of water required in the proposed process is significantly more (as steam, of course) than the conventional low pressure process, and accordingly is preferably 3 to 8 mols of water per mol of carbon charged to the reactor. This greater water requirement does not significantly increase hydrogen production cost however.

As those skilled in the art know, the reaction is endothermic and requires heating to operate at the prescribed temperatures. As in the past, however, this is easily taken care of in the conventional fashion and more usually by placing th ecatalyst in externally fired tubes.

As to the shift reaction, the catalysts that can be employed there are the same that are employed in conventional low-pressure processes. Typically, these involve a chrome promoted iron oxide catalyst. Other more recent catalysts, however, employ copper-oxide, zinc-oxide mixtures. The latter type catalyst has been employed with a view to carrying out the shift reaction at lower temperatures on the order of about 350° to 500° F. To be more specific, illustrative examples of the catalysts commercially available are:

(1) Aero Catalyst HI-3 which is a 95% $Fe_2O_3$ and 4% $Cr_2O_3$ catalyst composition, is best used at a temperature of 600° to 800° F., a pressure of about 20 to 100 p.s.i.a. and space velocities of about 300 to 3000 Vg./Vc./hr. (Aero Catalyst HI-3 is a trademark for American Cyanamid Company's chrome-promoted iron oxide catalyst as above defined).

(2) Girdler G-3A and G-3B are also chrome-promoted iron oxide catalyst for use at temperatures of about 600° to 900° F. The G-3B has a greater strength and lower bulk density preferably used in a pressure range of about 100 to 400 p.s.i.g. at a temperature of about 650° to 850° F., whereas the G-3A is best used at a pressure in the range of atmospheric to about 150 p.s.i.g. The G-3B is also preferred if the gas contains sulfur compounds. (Girdler G-3A and G-3B are trademarks of the Chemetron Corporation for its chrome-promoted iron oxide catalysts).

(3) C-12 and C-16 are co-precipitated iron-oxide chrome oxide catalysts. C-16 being adapted for higher pressures and applications where the catalyst must be removed from the reactor for screening out foreign matter and then returned. Otherwise, the general preceding operating conditions may be used. (C-12 and C-16 are the designation of Catalyst and Chemicals, Inc. for its co-precipitated iron oxide-chrome oxide catalysts.)

(4) Functionally equivalent catalysts of the chrome-promoted iron oxide type above but being markedly different in respect to permormance at different more favorable temperature ranges of about 350° F. to about 500° F. are available under the designation C-18 and C-18-1. They are copper oxide-zinc oxide combinations defined more fully, and their preparation, likewise, in U.S. 3,303,001. Earlier catalysts of similar materials which operate at slightly higher temperatures can be prepared from the teachings of U.S. 1,797,426. (C-18 and C-18-1 are the designations of Catalyst and Chemicals Corporation's for their copper oxide-zinc oxide catalysts of the type defined in U.S. 3,303,001).

(5) Girdler G-66 and G-66-B are copper-based catalysts suitable in the lower range of about 350° F. to about 700° F. The activity of G-66-B is greater at elevated pressure.

The hot water absorption process of removing $CO_2$ from the shift reaction product stream is generally carried out at about 60° F. to 400° F. and at the same pressure as the hydrogen production step but preferably is carried out at about 150° F. to 270° F. and about 1500 to 3000 p.s.i.g.

The hydrogen obtained in the present process, while at considerably higher pressures than that obtained in the prior processes, may yet be below the desired manufacturing process in which it is to be employed. However, in most cases, the pressure can be brought up to the operating pressure of the manufacturing process by relatively efficient and inexpensive centrifugal compressors, as contrasted with the expensive reciprocating compressors normally employed. Carbon dioxide is also recovered from the process (using water absorption or other) at high pressure and can be exhausted through the drive system of compressors or electrical generators. If another process (such as urea manufacture) uses carbon dioxide at pressures above atmospheric but lower than the absorption pressure, the need for intermediate compressors is, of course, eliminated.

To facilitate the understanding of the invention certain details and illustrative embodiments will now be set forth; however, of course, it is to be fully understood and appreciated that the invention is not limited to the specific conditions or details set forth in these examples, except as they are found in the appended claims, since the process is capable of many modifications and variations in conditions, such modifications and variations being aided, suggested, or indicated by the discussion of the process as herein and the discussions of the trends of the effect of the various factors.

ILLUSTRATIVE EXAMPLES

In order to better illustrate the differences and also the similarities between conventional low pressure processes and the present high pressure process typical operating data and typical product stream analysis to be obtained from each are set forth herein.

In each of the processes the methane is fed into a reformer which is loaded with a reforming catalyst such as Girdler G-56 (Girdler G-56 is defined hereinabove). In the low pressure process a conventional reformer is used but in the high pressure process the same basic design is used but it is constructed of special materials to withstand the high pressures and temperatures employed. Typical conditions in the reformer stage are as follows:

| | | |
|---|---|---|
| Reformer reactor pressure, p.s.i.g. | 147 | 2,940 |
| Reformer reactor temperature, °F. | 1,500 | 1,900 |
| Mols of methane fed per hour | 1.0 | 1.0 |
| Mols of water as steam) fed per hour | 2.5 | 5.0 |
| Conversion of methane to products approximate, percent of feed | 85 | 85 |

Typical product streams from such reformer reactors would analyze approximately (in volume percent) as follows:

| | | |
|---|---|---|
| Water | 26 | 49 |
| Hydrogen | 54.3 | 37.8 |

The remainder of each product stream being a mixture of carbon monoxide, carbon dioxide, and methane. The product stream definition employed in the art is usually calculated on a water free basis. As usually defined the illustrative product stream compositions would be as follows:

| | Conventional Process | Present Process |
|---|---|---|
| Reformer reactor product composition volume percent (water free): | | |
| Methane | 4 | 4 |
| Carbon monoxide | 15 | 13 |
| Hydrogen | 74 | 74 |
| Carbon dioxide | 7 | 9 |

The reformer product stream is next charged to a conventional shift reactor with construction in each case being suitable for the respective pressure employed, which is 135 p.s.i.g. and 2930 p.s.i.g. In the case of the product of the high pressure reformer the temperature is first lowered to about 450° F. by a heat exchanger. The product stream temperature of the low pressure reformer on the other hand is lowered by the addition of water as well as a heat exchanger in order to increase the water content of the shift charge. As those skilled in the art know the presence of sufficient steam in a shift charge will prevent reduction and deactivation of the catalyst. The shift reactor is loaded with a shift catalyst, Girdler G-66-B. The respective product streams typically analyze as follows:

| Approximate volume percent (water free): | | |
|---|---|---|
| Methane | 3 | 3 |
| Carbon dioxide | 19 | 19 |
| Hydrogen | 77 | 77 |

The shift reactor product from the low pressure reaction is scrubbed with a hot potassium carbonate solution in conventional fashion to remove carbon oxides comprised substantially only of carbon dioxide. The product from the high pressure reaction is scrubbed with hot water at about 200° F. to remove the carbon dioxide. Typically the scrubbed product streams have the following analysis:

| Composition, approximate volume percent (water free, no methane removal): | | |
|---|---|---|
| Methane | 4 | 5 |
| Hydrogen | 96 | [1] 95 |

[1] About 1% hydrogen is lost due to dissolution in the hot water in the high pressure process.

If desired, trace quantities of carbon oxides can be removed by the well known "methanation" process routinely used by industry. In this optional step, the following reactions take place:

$$CO_2 + 4H_2 \rightarrow CH_4 + 2H_2O$$

$$CO + 3H_2 \rightarrow CH_4 + H_2O$$

Thus, carbon oxides are removed but the methane content of the final product hydrogen increases slightly. This step is sometimes required if the hydrogen is to pass across a reduced iron ammonia synthesis catalyst.

Having now described the invention, many ramifications and modified embodiments, as the result of both additives and deletions, will readily occur to those skilled in the art. Insofar as such variations do not depart from the spirit and scope of the invention described in this application, they are intended to be embraced by the appended claims in their broadest construction.

What is claimed is:

1. A process for producing hydrogen which comprises in combination a high pressure steam-hydrocarbon reforming step and a high pressure shift reaction step, said process being further charatcerized in that said stem-hydrocarbon reforming is carried out at a temperature in the range of about 1900° to 2100° F. and a pressure of about 1,500 to 3,000 p.s.i.g. over a supported nickel reforming catalyst, to form a product mixture comprising hydrogen and carbon monoxide, said reaction product mixture being charged with excess steam to a shift reaction carried out at a temperature of about 350° to 900° F. and a pressure of about 1,500 to 3,000 p.s.i.g. over a shift catalyst, wherein said shift catalyst is a member of the group consisting of a copper-base shift catalyst and a chrome-promoted iron oxide catalyst, said process being still further characterized by the shift reaction effluent being scrubbed with water at a temperature of about 60° to 400° F. and a pressure of about 1,500 to 3,000 p.s.i.g.

2. A process of producing hydrogen according to claim 1 wherein the hydrocarbon feed is methane.

3. A process of producing hydrogen according to claim 2 wherein the shift catalyst is a copper-base shift catalyst and said shift reaction temperature is in the range of about 350° to 700° F.

4. A process for producing hydrogen according to claim 2 wherein the shift catalyst is a chrome-promoted iron oxide catalyst and said shift reaction is carried out at a temperature at a range of about 600° to 900° F.

5. A process for producing hydrogen according to claim 3 wherein the shift reactor effluent is scrubbed with water at a temperature of about 150° to 270° F. and a pressure of about 1500 to 3000 p.s.i.g.

6. A process for producing hydrogen according to claim 4 wherein the shift reaction product stream is scrubbed with hot water at a temperature of about 150° to 270° F. and a pressure of about 1500 to 3000 p.s.i.g.

7. A process of producing hydrogen according to claim 2 wherein a minimum of about 2 moles of water as steam per atom of carbon charged is employed in both the reforming step and in the shift reaction step.

8. A process for producing hydrogen according to claim 6 wherein the mole ratio of water and steam per atom of carbon in each the reforming step and the shift reaction step is in the range of about 3 to 8 moles of water per mole of carbon charge.

References Cited

UNITED STATES PATENTS

| 1,797,426 | 3/1931 | Larson | 23—213 |
| 1,896,916 | 2/1933 | Perley | 23—213 XR |
| 3,264,066 | 8/1966 | Quartulli et al. | 23—212 |
| 3,382,044 | 5/1968 | Cromeans | 23—213 XR |
| 3,382,045 | 5/1368 | Habermehl et al. | 23—213 |
| 3,387,942 | 6/1968 | Habermehl et al. | 23—213 |
| 3,388,972 | 6/1968 | Reitmeier et al. | 23—213 |
| 3,392,001 | 7/1968 | Lorenz et al. | 23—213 |
| 3,395,004 | 7/1968 | Taylor et al. | 23—212 XR |
| 3,417,029 | 12/1968 | McMahan | 23—212 XR |
| 3,418,082 | 12/1968 | Ter Hoar | 23—213 |

EDWARD STERN, Primary Examiner

U.S. Cl. X.R.

23—2, 150, 212